United States Patent [19]

Nonini

[11] Patent Number: 5,184,493
[45] Date of Patent: Feb. 9, 1993

[54] SUPPORT FOR ROLLING RINGS ON ROLLING STANDS HAVING ROLLS SUPPORTED AS CANTILEVERS

[75] Inventor: Geremia Nonini, Buttrio, Italy

[73] Assignee: Danieli & C. Officine Meccaniche Spa, Buttrio, Italy

[21] Appl. No.: 797,024

[22] Filed: Nov. 25, 1991

[30] Foreign Application Priority Data

Nov. 27, 1990 [IT] Italy .................. 60459/90[U]

[51] Int. Cl.⁵ .................. B21B 31/00; B21B 31/08
[52] U.S. Cl. .................. 72/237; 492/1; 492/49
[58] Field of Search .......... 72/237, 238, 481; 29/123, 125, 129, 129.5

[56] References Cited

U.S. PATENT DOCUMENTS

| | | | |
|---|---|---|---|
| 3,793,869 | 2/1974 | Hufnagl et al. | 29/125 |
| 3,851,365 | 12/1974 | Oxlade | 29/129.5 |
| 4,817,410 | 4/1989 | Yatsuzuka et al. | 72/238 |

FOREIGN PATENT DOCUMENTS

| | | | |
|---|---|---|---|
| 0301286 | 7/1988 | | |
| 67543 | 11/1975 | France | |
| 0045179 | 12/1978 | Japan | 29/123 |
| 0168207 | 7/1988 | Japan | |
| 0839635 | 6/1981 | U.S.S.R. | 72/237 |
| 1252549 | 11/1971 | United Kingdom | 29/125 |
| 2193670 | 2/1988 | United Kingdom | |

Primary Examiner—Lowell A. Larson
Assistant Examiner—Michael J. McKeon
Attorney, Agent, or Firm—Antonelli, Terry, Stout & Kraus

[57] ABSTRACT

Support for rolling rings on rolling stands having rolls supported as cantilevers, comprising a shaft (16) with a first flange (12) and a second flange (13), a rolling ring (11) having substantially parallel lateral walls being interposed therebetween, the second flange (13) operating towards the first flange (12) owing to the action of threaded clamping bolts (14), the first and second flanges (12-13) including undercuts (17), in which support:

the shaft (16) extends beyond the rolling ring (11) so as to create a first toric protrusion (20), the second flange (13) comprises a toric hollow (21), which mates with the first toric protrusion (20) and is coupled thereto, and comprises also a second toric protrusion extending within the first toric protrusion (20) and mating therewith, and the undercuts (17) of the first (12) and second (13) flanges include rings (22) made of an antifriction material.

1 Claim, 1 Drawing Sheet

SUPPORT FOR ROLLING RINGS ON ROLLING STANDS HAVING ROLLS SUPPORTED AS CANTILEVERS

BACKGROUND OF THE INVENTION

This invention concerns a support for rolling rings on rolling stands having rolls supported as cantilevers, as set forth in the main claim.

To be more exact, this invention concerns an improved support to hold and position and to set in rotation and keep in rotation the rolling rings of rolls supported as cantilevers on a rolling stand.

Rolling stands having rolls supported as cantilevers are known whereby the rolling stands bear rolling rings with one or more rolling grooves, and these rings replace the normal rolls.

It is known that at the present time these rolling rings are made of a very hard material of a sintered type.

It is also known that these rolling rings are fitted and then clamped on appropriate supports, which have the purpose of holding and positioning the rolling rings reciprocally and of transmitting rotary motion to the rolling rings.

The rotary motion is normally transmitted by friction and not by means of pins or keying.

It is therefore obvious that these supports perform very important and essential functions in the working of a rolling stand.

A system for fitting the cantilever rolling rings on the supports 10 is therefore an essential part of the support so that the latter can perform its functions as well as possible; a preferred present system is the one shown in FIG. 1.

FIG. 1 shows a rolling ring 11 fitted to a shaft 16, which includes a first flange 12, a second flange 13 with a half-shaft 116 being comprised; the two shafts 16 and 116 rest against each other substantially along the line 15 of the coupling, which is located at an intermediate position along the length of the hole serving for the coupling of the rolling ring 11.

Threaded bolts 14 are used to clamp the second flange 13 against the first flange 12 and therefore to clamp the rolling ring 11 in an intermediate position.

Undercuts 17 are included in the first flange 12 and in the second flange 13 and act as pre-loading means in the clamping.

This solution under load entails a plurality of shortcomings, which reduce the life and capability of the known embodiment.

A first shortcoming is the breakages 18 which occur in the first flange 12.

A second shortcoming is the deflections 19 which take place in the first flange 12 and do not allow the rolling ring 11 to be positioned correctly; these deflections 19 remain as permanent strains.

A third shortcoming is the deflections 119 which occur in the second flange 13 and entail an incorrect positioning of the rolling ring 11; these deflections 119 too remain as permanent strains.

When a deflection becomes a permanent strain, the affected parts of the support 10 become unusable.

A fourth shortcoming is the reduced clamping torque which can be applied to the bolts 14.

A fifth shortcoming is the inability of the support 10 under given conditions to set the rolling ring 11 in rotation and therefore to make the rolling stand operational.

The documents GB-A-2,193,670 and GB-B-1,252,549 disclose a support for rolling rings on rolling stands with rolls supported as cantilevers, whereby a first flange extends along the whole length of the roll. However, the roll has a trapezoidal conformation and the thrust of the flanges does not create the strain according to the example of the attached FIG. 1. But this solution is very expensive owing to the special form of the roll, which in any event is fragile and unsuitable for heavy loads.

Document EP-A-0.301.286 discloses a roll made of a hard sintered metal and fitted to a shaft having two supports, one per side. This type of installation provides a roll with parallel lateral surfaces and with flanges having parallel lateral walls and consisting of an antifriction metal. This installation is not suitable to transmit great torque since the flanges bend and lose their capability of transmitting the load.

SUMMARY OF THE INVENTION

To overcome these problems, the present applicant has designed, tested and embodied various solutions and in the end has achieved the solution proper to this invention.

The invention is set forth and characterized in the main claim.

DESCRIPTION OF THE PREFERRED EMBODIMENT

Figure 1:
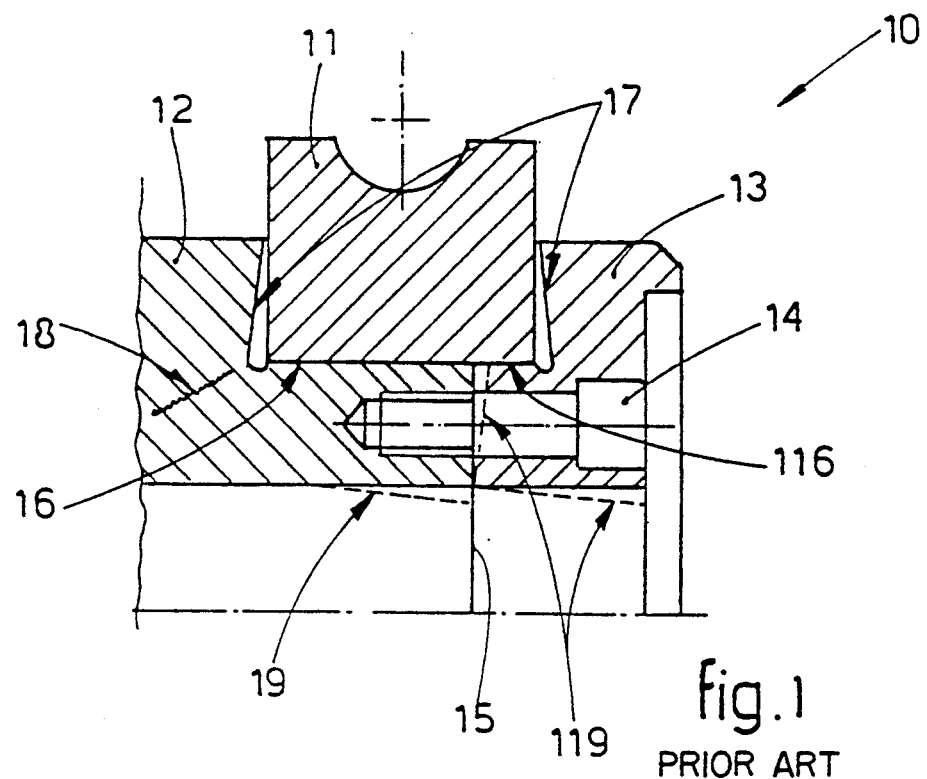
FIG. 1 shows a rolling ring fitted to a conventional support.
Figure 2:
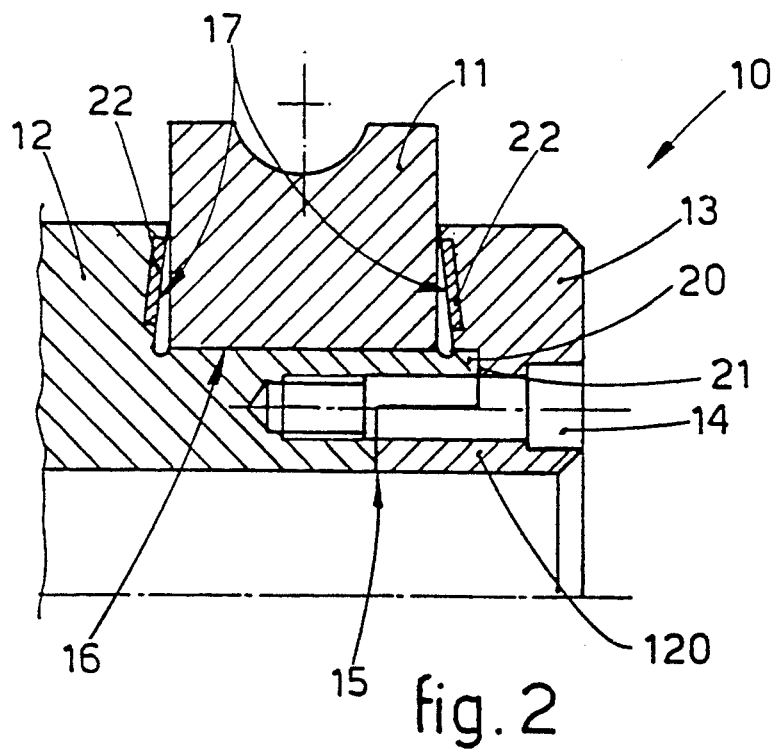
FIG. 2 shows a rolling ring fitted to the support of the present invention.

The invention is shown in FIG. 2, which shows a shaft 16 that extends beyond the extent of the thickness of the rolling ring 11 so as to create a first toric protrusion 20.

This first toric protrusion 20, which is made as a cantilever ring, enters with a tight fit into a mating toric hollow 21, which re-positions the line 15 of the coupling in the vicinity of the position of the terminal extent of the thickness of the rolling ring 11 and in correspondence with the coupling hole.

The toric hollow 21 includes in the second flange 13 a second toric protrusion 120 which is mated perfectly with the first toric protrusion 20.

This coupling, being precision-made, of the first toric protrusion 20 with the toric hollow 21 and of the first toric protrusion 20 with the second toric protrusion 120, determines a restriction of the reciprocal strains between the first flange 12 and second flange 13 when the rolling ring 11 is inserted and the support 10 is closed and pre-loaded.

Moreover, as can be seen, the rolling ring 11 is coupled completely to the shaft 16 alone, thus preventing any lack of continuity of contact between the surfaces, seeing that by means of the coupling of the toric hollow 21 with the first toric protrusion 20 the shaft 16 coupling the rolling ring 11 undergoes very light stresses due to pre-loading of the undercuts 17.

Furthermore, this embodiment enables the assembly bolts 14 to be lengthened, thus making possible an increase of the clamping torque with a greater length of bolts available on which the load can be distributed.

Next, the invention arranges to insert on the faces of the undercuts 17 rings 22 made of an antifriction material with a high adherence index, thus ensuring the absence of any slipping of the sintered rolling ring 11 on the support 10 even when there are high values of torque.

The rings 22 are subject to completely negligible dimensional yielding under load, thus ensuring at all times a good coincidence between the grooves of two reciprocal rolling rings 11.

I claim:

1. Support for rolling rings on rolling stands having rolls supported as cantilevers, comprising a shaft including a first portion with a first flange and a second portion with a second flange, a rolling ring having substantially parallel lateral walls being interposed between said first and second flanges, the second flange opposed to and being movable towards the first flange by means of the action of threaded clamping bolts, the first and second flanges including undercuts, wherein the first portion of the shaft has a first toric protrusion contacting an inner circumferential surface of said rolling ring and extending axially from one of said parallel lateral walls past the other of said parallel lateral walls; the second portion of the shaft comprises a toric hollow which mates with the first toric protrusion and is coupled thereto, and comprises also a second toric protrusion extending within the first toric protrusion and mating therewith, and wherein the undercuts of the first and second flanges include rings made of an antifriction material.

* * * * *